United States Patent

Berglund et al.

[15] 3,660,697

[45] May 2, 1972

[54] MONOLITHIC SEMICONDUCTOR APPARATUS ADAPTED FOR SEQUENTIAL CHARGE TRANSFER

[72] Inventors: Carl Neil Berglund, Plainfield; Harry Joseph Boll, Berkeley Heights, both of N.J.

[73] Assignee: Bell Telephone Laboratories, Incorporated, Berkeley Heights, N.J.

[22] Filed: Feb. 16, 1970

[21] Appl. No.: 11,447

[52] U.S. Cl. ....................... 307/304, 317/235 R, 307/221 C, 317/235 N, 317/235 B

[51] Int. Cl. ....................... H01l 17/00, H01l 11/14

[58] Field of Search ................ 317/235, 21.1, 22.2; 307/205, 307/238, 251, 279, 304, 221 C; 328/37

[56] References Cited

UNITED STATES PATENTS 3,390,273 6/1968 Weckler ............................... 317/235

FOREIGN PATENTS OR APPLICATIONS 6,805,705 10/1969 Netherlands ........................... 317/235

OTHER PUBLICATIONS

IEEE Journal of Solid–State Circuits, " Bucket–Brigade Electronics" by Sangster et al., June 1969, pages 131– 136

*Primary Examiner*—Jerry D. Craig
*Attorney*—R. J. Guenther and Arthur J. Torsiglieri

[57] ABSTRACT

The invention is a form of monolithic semiconductor apparatus adapted for the storage and manipulation of electronic signals representing information. Basically, the apparatus includes a plurality of spaced localized zones of one type semiconductivity adjacent the surface of a semiconductive bulk portion of the other type conductivity. A plurality of localized electrodes, registered in one-to-one correspondence with the localized zones, are disposed over a dielectric layer covering the semiconductive portions. Each of the electrodes is delimited in lateral extent so as to extend over substantially all of the space between a pair of closest zones and over a substantial portion of only one of that pair of zones so that the capacitance between the electrode and the zone over which it extends is substantially greater than the capacitance between that electrode and the other zone of that pair of zones. Signals in the form of varying deficiencies of majority carriers are stored temporarily in the localized zones and are gated sequentially from one zone to the zone next adjacent upon application of two-phase clock pulses to alternate electrodes. Constant background pulses upon which signals are superimposed are circulated to reduce distortion.

8 Claims, 3 Drawing Figures

INVENTORS C.N. BERGLUND
H.J. BOLL
BY Arthur J. Torsiglieri
ATTORNEY

MONOLITHIC SEMICONDUCTOR APPARATUS ADAPTED FOR SEQUENTIAL CHARGE TRANSFER

BACKGROUND OF THE INVENTION

This invention relates to information storage devices; and, more particularly, to monolithic semiconductor apparatus adapted for storing and sequentially transferring signals which represent information.

In a wide variety of electrical and electronic apparatus, the storage and manipulation of signals which represent information is an essential feature. Heretofore, such apparatus has often relied on electromagnetic mechanisms.

As techniques for fabricating monolithic integrated circuits have advanced and integrated circuit costs have decreased, a growing interest in monolithic semiconductor apparatus adapted for the storage and manipulation of information has become evident.

SUMMARY OF THE INVENTION

For simplicity and clarity of explanation, the invention will be described primarily in terms of a basic shift register, in which form especially advantageous use is contemplated.

It will be appreciated by those in the art that with slight modifications, some of which will be alluded to hereinbelow, other applications, such as logic, memory, delay, vidicon scanning, and image display are readily realizable.

In one aspect the invention involves monolithic semiconductor apparatus including a semiconductor wafer which comprises a bulk portion of a first conductivity type and a plurality of spaced localized zones of opposite conductivity type disposed adjacent a surface of and forming a corresponding plurality of PN junctions with the bulk portion. A dielectric layer is disposed over the surface of the wafer; and a plurality of localized electrodes are disposed over the dielectric layer and are registered in one-to-one correspondence with the plurality of localized surface zones. Each of the electrodes is delimited in lateral extent so as to extend over substantially all of the space between a pair of closest zones and over a substantial portion of one of that pair of zones so that the capacitance between the electrode and the zone over which it extends is substantially greater than the capacitance between that electrode and the other zone of that pair of zones.

More specifically, in a preferred embodiment of our invention, the localized zones are disposed successively in a line and are equally spaced. In addition to the localized electrodes, a first conduction path and a second conduction path are disposed over the surface of a thicker dielectric portion along the row of zones. Every second electrode in the succession is coupled to the first conduction path and the remaining electrodes are coupled to the second conduction path.

In operation, two-phase clock pulses are applied to the first and second conduction paths which, in turn, couple those pulses to the alternate electrodes. Because of the capacitive coupling between the electrodes and the semiconductor, these clock pulses cause information, in the form of variable deficiencies of majority carriers, to be transferred sequentially from one zone to the next in shift register fashion.

It will be apparent to those in the art that this form of transfer need not be confined to a one-dimensional line, but may be adapted for fan-in and fan-out as required, for example, in logic operations, and that two-dimensional arrays may also be used.

In another aspect, our invention includes the realization that charge transfer of the type hereinbefore described is characterized by a charge-dependent transfer rate; and accordingly, each time charge is transferred, some finite portion of the charge is left behind. This incomplete transfer of charge can result in signal distortion and in most instances is cumulative. Since the distortion can be cumulative, in those cases the number of shift register stages which could be included without incurring undue distortion would be unduly limited if measures were not taken to reduce that distortion.

Accordingly, a preferred form of our invention includes means for causing a series of equal background pulses to be constantly transferring through the shift register at the clock rate to reduce that distortion.

BRIEF DESCRIPTION OF THE DRAWING

The invention will be better understood from the following more detailed description taken in conjunction with the accompanying drawing in which.

It will be appreciated by those in the art that the figures have not been drawn to scale, but that certain portions have been exaggerated in relative size for clarity of explanation.

DETAILED DESCRIPTION

Figure 1:
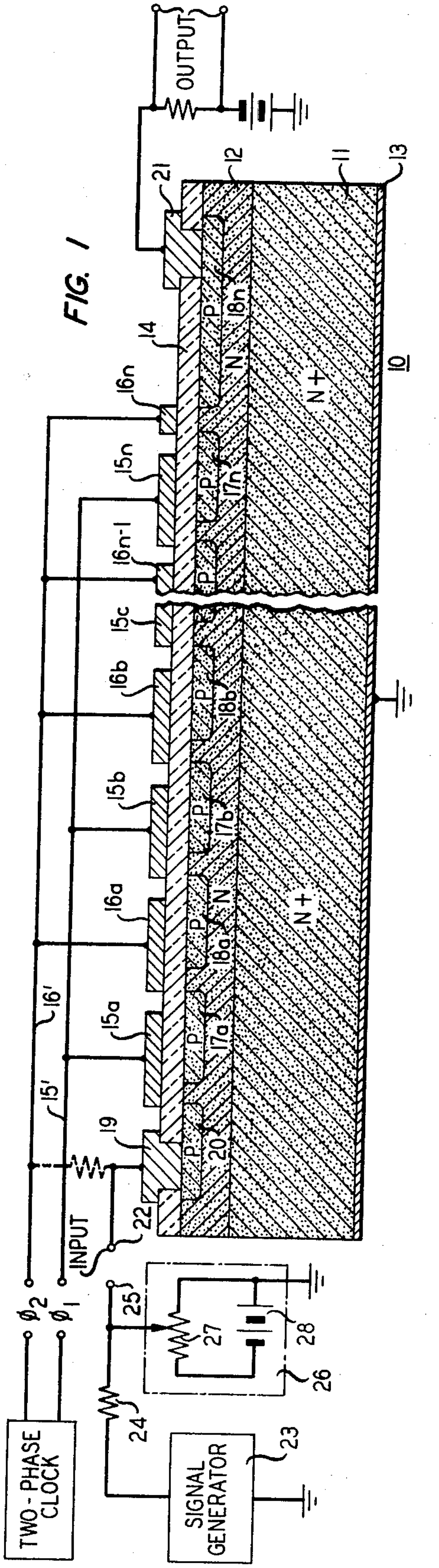
FIG. 1 shows a cross-sectional view of a basic form of monolithic semiconductor apparatus adapted for information storage and transfer in accordance with our operation.

With more specific reference to the drawing, in FIG. 1 there is shown a basic form of a monolithic semiconductor embodiment of our invention in combination with a signal generator, clock pulse generator, and output means useful for operation in accordance with our invention. As shown, the monolithic apparatus 10 includes a bulk portion 11 and 12 of a first type conductivity (shown illustratively as N-type) adjacent the surface of which there has been formed a plurality of localized zones 17*a* through 17*n* and 18*a* through 18*n* of the other type conductivity, i.e., P-type. The semiconductive portion of the wafer is covered with a dielectric layer 14 upon which there are formed a plurality of electrodes 15*a* through 15*n* and 16*a* through 16*n* registered in a one-to-one correspondence with the plurality of localized zones. Conductors designated 15' and 16' are connected to each second electrode, i.e., to electrodes 15*a*–15*n* and 16*a*–16*n*, respectively. An input terminal 22 is connected to an input zone 20 through an electrode 19 which is in ohmic contact with zone 20.

Each pair of closest zones, e.g., 20 and 17*a*, 17*a* and 18*a*, 18*a* and 17*b*, etc., may be thought of as the source and drain of an insulated gate field effect transistor (IGFET). It will be appreciated then that one of the electrodes 15 and 16 may be thought of as the gate electrode of an IGFET and the N-type surface portion between any pair of closest zones will be thought of as the channel of an IGFET.

Figure 2:
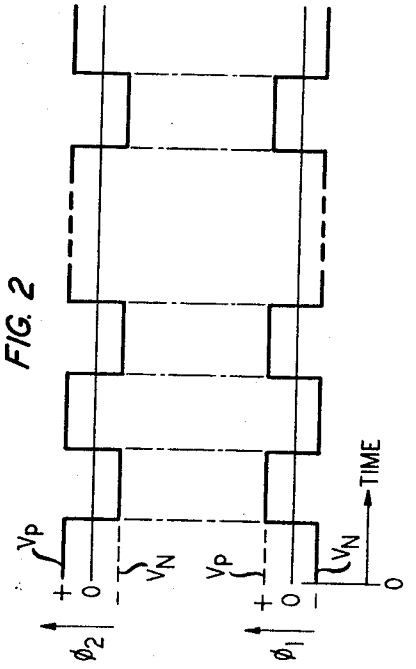
FIG. 2 is a schematic indication of a pair of voltage waveforms suitable for use as two-phase clock pulses for causing information to be stored and transferred.

It should be noted in FIG. 2 that each of the electrodes is delimited in lateral extent so as to extend over substantially all of the space between a pair of closest zones, i.e., over the channel, and over a substantial portion of only one of that pair of zones so that the capacitance between the electrode and the zone over which it extends is substantially greater than the capacitance between that electrode and the other zone of that pair of zones. More specifically, and for example, electrode 16*a* overlies completely the N-type portion separating zones 17*a* and 18*a* and overlies a much greater portion of zone 18*a* than of zone 17*a*.

Operation of the monolithic apparatus 10 as a shift register will now be described in detail. In operation, clock pulses $\phi_1$ and $\phi_2$, supplied by two-phase clock means 29, are applied to conduction paths 15' and 16', respectively. Electrodes 15*a*–15*bJ*, connected to conduction path 15 ,' and electrodes 16*a*–16*bJ*, connected to conduction path 16 ,' simultaneously are driven alternately positive and negative as $\phi_1$ and $\phi_2$, respectively, alternate between positive and negative potentials.

Bulk portion 11 is shown connected through an ohmic contact (metallic electrode 13) to ground. Of course, electrode 13 need not be connected to ground, but may be connected to any fixed reference potential provided the clock voltages are correspondingly adjusted.

Assume that at time equals zero, $\phi_1$ is pulsed to its most negative value and $\phi_2$ is pulsed to its most positive value. If the $\phi_1$ pulse is sufficiently negative, i.e., more negative than some threshold voltage $V_T$, the gate electrodes numbered 15 (15*a*–15b*n*) induce a P-type surface channel in the N-type silicon surface portions underlying those gate electrodes. The localized surface zones 17 (17*a*–17*n*) also are driven negative because of the capacitive coupling between electrodes 15 and zones 17. Since at this time $\phi_2$ is pulsed positive, electrodes 16 (16*a*–16b*n*) tend to inhibit the formation of P-type channels in those N-type surface portions thereunder, and, because of the capacitive coupling between electrodes 16 and zones 18 (18*a*–18b*n*–1), zones 18 are all driven positive. Notice that electrode 16*n* need not substantially overlap zone 18*n* because zone 18*n* is held at a negative bias by output circuitry including, for example, a battery 30 in series with a resistor 31.

Correspondingly, when the clock pulses reverse polarity one-half clock cycle later, electrodes 16 induce P-type channels thereunder and tend to drive zones 18 negative while electrodes 15 inhibit P-type channels thereunder and tend to drive zones 17 positive.

For the purpose of discussion, we define $V_N$ to be the most negative clock voltage and $V_P$ to be the most positive clock voltage. The threshold voltage $V_T$ is the gate voltage at which the N-type surface is just beginning to invert to P-type. Also, to simplify the discussion, it will be assumed that the junction capacitance ($C_j$) between each localized zone and the bulk portion is small compared to the capacitance ($C_{ox}$) between the gate electrode and that zone. Otherwise, all of the voltage relationships discussed hereinbelow would be multiplied by the quantity $$\frac{C_{ox}}{C_{ox}+C_j}$$

which is a second-order effect and is variable because $C_j$ varies with the voltage over the junction. This is a reasonable assumption because in practice $C_j$ can, in fact, be made small compared to $C_{ox}$.

Consider now the operating condition in which the input is left floating so that no charge can be introduced at input zone 20 and the clock is allowed to run for awhile. Under this condition the system reaches a steady state where the potentials of localized zones 17 and 18 alternate between $V_N$–$V_T$ and $2V_N$–$V_P$–$V_T$ at each reversal of the clock pulse. For example, if $V_T$= –2 volts, $V_N$ = –6 volts, and $V_P$ = 0, the potentials of zones 17 and 18 will alternate between –4 volts and –10 volts at each reversal of the clock. Inasmuch as the N-type portions 11 and 12 are grounded, these negative voltages on zones 17 and 18 cause all of the PN junctions between those zones and the bulk to be reverse-biased. Consequently, at this steady state, there is a deficiency of majority carriers (holes) in each of zones 17 and 18.

Assume now that a number of majority carriers are introduced into input zone 20 during one of the times when $\phi_1$ is most negative. This can be done, for example, by applying a voltage to input terminal 22 sufficient to make the voltage between input zone 20 and electrode 15*a* greater than the threshold voltage $V_T$. Because the negative voltage on electrode 15*a* has induced a P-type surface channel between zones 20 and 17*a*, and because zone 17*a* is negative with respect to zone 20, those majority carriers will transfer to the right into zone 17*a*.

If the potentials of the clock lines 15' and 16' are now reversed, such that a positive voltage is applied to electrodes 15 and a negative voltage is applied to electrodes 16, surface channels will be induced under electrodes 16 and inhibited under electrodes 15. Additionally, zones 18 will become more negative than zones 17 because of the capacitive coupling. Accordingly, those majority carriers will transfer another step to the right into zone 18*a*. In like fashion, at each reversal of the clock polarity, those majority carriers will transfer sequentially to the next zone to the right.

Similarly, if when clock pulse $\phi_1$ is negative and input zone 20 is made negative with respect to electrode 15*a*, no excess majority carriers (above the steady state deficiency level) will be transferred during that clock cycle from zone 20 to zone 17*a*. Accordingly, at the reversal of the clock pulse, there will be no net charge to transfer from 17*a* to 18*a*. Thus either a quantity of charge or the absence of such a quantity is shifted step-by-step in digital shift register fashion toward the output.

It should be noted that there cannot be a flow of majority carriers to the left in the apparatus of FIG. 1 because even though, for example, zone 18*a* is sometimes more positive than zone 17*a*, the voltage on electrode 16*a* at that time is also positive and so, at that time, there is no P-type channel between zones 18*a* and 17*a* through which holes could flow. Accordingly, signals (in the form of the presence or absence of excess holes above the steady state deficiency) always flow to the right sequentially from zone 17*a* to 18*a* to 17*b* to 18*b*, etc., to 17*n* and 18*n* at the output.

Output zone 18*n* is held at a constant negative bias by battery 30 in series with resistor 31; and accordingly, once the excess holes reach zone 18*n*, this is immediately manifested in the form of a current drawn through resistor 31 and battery 30. Of course, this produces a voltage pulse over resistor 31 which can then be detected as an output between terminals 32 and 33, as indicated in FIG. 1. Of course, it will be understood that the simple output stage including battery 30 and resistor 31 are included only to illustrate the basic form of one mode of detecting signals at the output. Capacitively coupled output stages such as disclosed, for example, in U.S. application Ser. No. 11,541, filed of even date herewith, may also be used.

A shift register embodiment has been described because it is a desirable vehicle for simplicity and clarity of explanation and because shift registers are important building blocks from which many forms of logic, memory, and delay devices can be derived. For example, it will be appreciated that at any intermediate point, the shift register chain could be tapped into and fan-in and/or fanout could be achieved if desired for some logic application.

Further, it will be appreciated that the shift register can be operated in a recirculation mode either for simply increasing the storage duration (delay) or for regenerating the signal to overcome noise, charge losses, and other forms of signal degradation by simply connecting the output signal back to the input stage through an appropriate regeneration circuit.

It will be understood by those in the art that the storage and transfer of signals through the apparatus described hereinabove may be thought of as the storage and transfer of a number (or the absence of a number) of majority carriers in excess of some steady state deficiency level in the P-type zones. Equivalently, it may be thought of as the storage and transfer of charge (or voltage) on the parallel combinations of the pairs of capacitances ($C_j$) associated with the P–N junctions corresponding to each P-type zone and the overlap capacitance ($C_{ox}$) between the gate electrode and that P-type zone. The capacitance value of each of these parallel pairs of capacitances ($C_j + C_{ox}$) will be designated "C" for the purposes of discussion hereinbelow.

An important additional feature is our realization that charge transfer of the type hereinbefore described is characterized by a charge-dependent transfer rate, i.e., the rate of charge transfer depends on the amount of charge to be transferred. Consequently, each time charge is transferred, some finite portion of the charge is left behind. Having realized and verified experimentally that this incomplete transfer of charge can result in signal distortion and can be cumulative, we have analyzed the problem and have discovered that the signal degradation due to incomplete charge transfer depends inversely on the quantity of charge being transferred. Hence, for best performance of the shift register, the signal to be shifted through the register should always be superimposed on a d-c background which is sufficiently large to reduce signal degradation below a desired amount.

However, there is a maximum amount of charge that can be transferred for a given magnitude of clock pulse voltages applied. This can be appreciated by realizing that for the desired charge transfer to take place, the transferee zone must remain negatively biased with respect to the transferor zone throughout the transfer operation. Since the charge is the product of voltage and capacitance, the maximum amount of charge that can be transferred can be no greater than the capacitance (C) of the parallel pairs of capacitances associated with the zones multiplied by the difference between the most positive clock voltage and the most negative clock voltage. For example, if the clock pulses are oscillating between $+V_0$ and $-V_0$, the voltage difference between the positive clock pulse and the negative clock pulse is $2V_0$. Consequently, the maximum amount of charge that could be transferred must be less than $2CV_0$. Of course, practically speaking, the maximum charge must be less than $2CV_0$ since the transferee zone must always maintain some finite negative voltage with respect to the transferor zone for charge transfer to take place.

An additional limitation on the maximum charge that can be transferred is that the P-type zones should be prevented from becoming forward biased with respect to the bulk portion 11 and 12. More specifically, for P-channel devices with negative thresholds, as shown in FIG. 1, this results in an upper limitation of $C(V_0+V_T)$.

Another important feature of the preferred form of our invention stems from the appreciation that optimum operation of the apparatus in FIG. 1 will be limited to some extent by any surface states which exist at the interface between dielectric 14 and those portions of N-type layer 12 which extend to the surface. Our analysis has also shown that signal degradation due to surface states will also vary inversely as the quantity of charge being transferred, as did the signal degradation due to incomplete charge transfer. Hence for best performance of the apparatus from both the viewpoint of surface states and incomplete charge transfer, the signal to be shifted through the shift register should be superimposed on the maximum amount of d-c background charge consistent with the limitations hereinabove described. Also, in this context, it can be demonstrated that signal degradation caused by these surface states is reduced in direct proportion as the ratio $A_D/A_g$ is increased, where $A_D$ is the area by which the gate electrode overlaps the localized zone thereunder and $A_g$ is the area of the channel between the adjacent localized zones.

In practice it will also usually be desirable to superimpose a negative DC bias on all the gate electrodes and have the clock voltages oscillating above and below this DC bias. However, the clock voltages must be adjusted with respect to the negative DC bias to ensure that the channels connecting adjacent zones are alternately inverted and not inverted so as to alternately couple and decouple those adjacent zones so as to avoid signal transfer in the wrong direction. This will tend to prevent electrons from being drawn into the surface states and thereby tend to reduce the number of holes which are lost (by recombination) as they are transferring through the channel.

More specifically again with reference to FIG. 1 there is shown a signal generator 23 in series with a resistor 24. Assume terminal 25 is connected to input terminal 22. Also connected to terminal 25 is a circuit shown in broken line rectangle 26 which circuit is intended to control the amount of d-c background pulses available to P-type zone 20. More specifically, it has been assumed that the signal generator has a low series internal resistance so that whenever the clock pulse $\phi 1$ is at its most negative level (which tends to induce a corresponding negative charge on zone 17*a* and on input P-type zone 20) a pulse of current will be drawn through resistor 24 even though no signal has been generated by the signal generator 23.

The circuit shown inside broken line rectangle 26 in FIG. 1 includes a tapped resistor 27 in series with a battery 28 of polarity such as to draw current from node 25 to ground. Thus it will be seen that the circuit comprising battery 28 and tapped resistor 27 can be used to reduce the amount of d-c pulse which is drawn through the signal generator so that the amount of background d-c pulse available at the input each time the $\phi 1$ pulse is negative will be determined by resistor 24 in combination with the circuit of broken line rectangle 26.

Alternatively instead of using the circuit shown in broken line rectangle 26 one could simply include the phantom resistor 29 between line 16 and electrode 19 in FIG. 1. With this phantom resistor included and remembering that when $\phi 1$ is negative $\phi 2$ is positive, it will be appreciated that a positive pulse will be available at input zone 20 whenever electrode 15*a* is negative such that a background d-c pulse would always be transferred from zone 20 to zone 17*a* at each cycle of the clock pulse. The size of resistor 29 will determine the magnitude of the background d-c pulses available for a given $\phi 2$ voltage.

Figure 3:
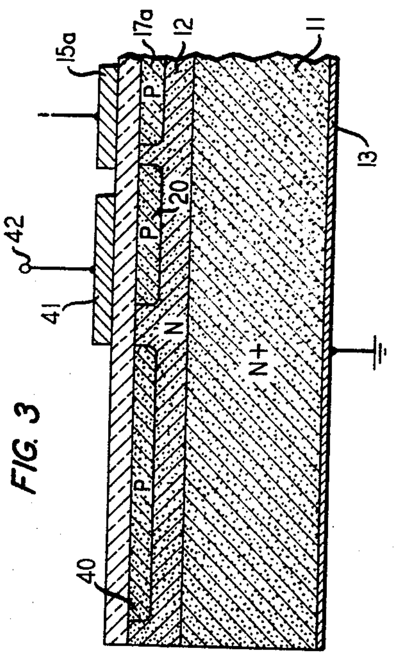
FIG. 3 shows a cross-sectional view of only the input portion of apparatus of the type shown in FIG. 1 with additional means included for enabling the introduction of background pulses and signal pulses.

In FIG. 3 there is shown still another alternative to the circuitry hereinbefore described for achieving a source of background and signal pulses for circulation through the circuit. More specifically, FIG. 3 shows only the left-most portion of monolithic apparatus of the type shown in FIG. 1 with an additional P-type zone 40 spaced from input zone 20. An electrode 41 overlies the dielectric over that portion of the N-type surface between P-type zone 20 and P-type zone 40 and overlaps a substantial portion of zone 20. An input terminal 42 is connected to electrode 41.

Zone 40 is made sufficiently large so that it is a reservoir of holes, i.e., so that the number of holes drawn off by the following operation can be continually replaced by generation of hole-electron pairs caused by photon absorption or thermal generation.

A number of modes of operation can be employed, the preferred one of which will now be described. To inject the background or signal pulses into the shift register, a negative pulse of relatively short duration is applied to terminal 42 each time $\phi_1$ is at its most negative potential. The pulse on terminal 42 induces momentarily a P-type channel between zones 40 and 20 through which a number of holes (determined by the duration of the pulse) into zone 20 and further into zone 17*a*. If, for example, a background pulse represents a digital "-zero," a digital "one" would be injected into the register simply by making the pulse applied to terminal 42 of relatively longer duration so that a greater number of holes thereby would be drawn from reservoir 40.

Obviously, any of the various described alternatives may be used for producing the background charge to be circulated through the register for minimizing signal degradation. Alternatively, any of the three techniques disclosed may be used in combination if desired or still others may be devised by those skilled in the art without departing from the spirit and scope of this invention.

At this point it should be evident that the essential objectives of our invention are the transfer of charge from one P-type zone to another in sequential fashion and the inclusion of background d-c pulses for minimizing signal degradation. It is to be understood that the various arrangements described are merely descriptive of the general principles of the invention and that various modifications will be apparent to those skilled in the art without departing from the spirit and scope of the invention.

For example, it will be apparent that the shift register is capable of operating in an analog fashion rather than in a digital fashion described hereinabove. More specifically, in analog operation one would not simply be transferring the presence or absence of charge but the absolute quantity of charge transferred would be important.

Further it will be apparent that the charge need not be introduced at input zone 20 as described in FIGS. 1 and 3, but may be introduced in parallel at each of the P-type zones by, for example, shining light on a device to generate the excess holes at each P-type zone. More specifically, an array of devices as shown in FIGS. 1 and 2 could be used as a solid state camera tube in a manner similar to that described in U.S. Pat. No. 3,403,284 issued Sept. 24, 1968 to T. M. Buck et al. However, whereas the readout of signal information in the Buck camera tube is accomplished by sweeping the P-type zones with an electronic beam, the readout of signals from our camera tube would be controlled electronically. More specifically, a circuit in accordance with out invention is capable of operation at frequencies up to 10 megahertz and higher. Since on the average a camera tube need only be read at intervals (called the "refresh" rate) of one-thirtieth of a second (about every 30 milliseconds) the information in any row of devices can be shifted out at a rate much faster than the refresh rate so that the virtually instantaneous shifting would not significantly disturb or be disturbed by the imaging process.

A very distinct advantage of the novel device concept herein disclosed is that materials suitable for the devices described are available and well understood. For example, these devices can be fabricated using silicon as the semiconductive portion and silicon oxide as the dielectric in accordance with well established technologies. Further combinations of insulators such as silicon dioxide-silicon nitride, silicon dioxide-aluminum oxide, etc. may be especially useful in some circumstances as the dielectric layer. Electrodes may be gold, combinations of gold, platinum and titanium, or any other desired conductive material, in any typical thickness, e.g., 0.1 to several microns.

The dimensions of the various zones, electrodes etc. may vary widely in accordance with well-known principles. However, we have fabricated structures wherein the P-type zones were about 2 mils wide and wherein the distance between P-type zones (the channels) was about 0.3 mils in length. A dielectric thicknesses of about 1,200 A. under the gate electrodes and 8,000 A. over the rest of the surface were used. The clock line conduction paths are disposed over the thicker dielectric to minimize the unwanted coupling between those paths and the semiconductor surface away from the gate electrodes. The electrodes were formed such that the ratio of the gate capacitance to the drain capacitance was about one to six. The N-type portion 12 shown in FIG. 1 could, for example, be about 1 ohm centimeter and the N+ bulk portion 11 may be as highly doped as desired such as for example 0.001 ohm centimeter.

It will be appreciated that the apparatus shown in FIG. 1 need not be fabricated in a structure including an N-type epitaxial layer over an N+ substrate but that the P-type zones may be formed in a uniformly doped N-type substrate. However, the inclusion of the N+ substrate tends to minimize the resistive interactions between the P-type zones at the higher signal frequencies and thus tends to improve the performance of the device.

While silicon has been suggested as one possible semiconductor suitable for use in the practice of this invention, it should be understood that the devices in accordance with our invention are in no way limited to the use of silicon and its associated technology. Other semiconductors may also be used.

Similarly, although an N-type bulk portion and P-type localized zones have been described, it will be apparent that a P-type bulk portion and N-type localized zone could as well be used.

What is claimed is:

1. In semiconductor apparatus of the type adapted for storage and sequential transfer of packets of mobile charge carriers representing signal information along the surface of a semiconductive body between an input and an output and comprising:

a semiconductive wafer including a bulk portion of a first type semiconductivity and a plurality of spaced, localized zones of opposite type semiconductivity disposed adjacent and forming a path along the surface of the wafer;

a dielectric layer disposed over said surface and over said localized zones;

a plurality of localized conductive electrodes disposed over the dielectric layer and registered with said localized zones such that each of said conductive electrodes extends over the space between a pair of said zones and over a portion of one zone of the pair of zones;

means for applying a pair of clock voltages alternately to successive ones of said electrodes, said pair of voltages being sufficient to produce in the localized zones a steady state deficiency of majority carriers in the absence of a signal applied to the input of the apparatus, and said pair of voltages additionally being such that their successive application to the electrodes is sufficient to cause the advance of a packet of mobile charge from one zone to the next zone along the path at each alternation of the voltages; and means for applying a signal to the input of said apparatus for selectively causing in synchronization with the clock voltages a variation in the number of majority carriers from the steady state deficiency level, said variation for representing signal information;

the improvement comprising:

means for superimposing upon the majority carriers representing signal information in the localized zones a fixed, predetermined quantity of background majority carriers, the quantity of the background majority carriers being sufficient that when superimposed upon the number of majority carriers representing information there always results a number of majority carriers greater than the steady state deficiency level, so that at each alternation of the clock voltages there is always transferred from a zone containing carriers representing signal information a net quantity of majority carriers to the succeeding zone along the path.

2. Apparatus as recited in claim 1 further comprising a first conduction path and a second conduction path, every second electrode being coupled to said first conduction path and the remaining electrodes being coupled to the second conduction path; and wherein the pair of clock voltages are applied to the first and second conduction paths.

3. Apparatus as recited in claim 2 wherein the input means comprises:

another zone of the second type semiconductivity spaced from one of said plurality of zones and disposed in such a manner that the electrode which overlaps said last-mentioned one zone also overlies the space between said another zone and said last-mentioned one zone;

a conductive electrode forming a low resistance electrical connection to said another zone;

a voltage source; and a resistor connected between said last-mentioned conductive electrode and the voltage source, the resistor and the magnitude of the voltage supplied by the voltage source being adjusted in relation to each other such that the voltage applied to said another zone is sufficient to cause injection therefrom of a sufficient amount of background charge as recited in claim 1.

4. Apparatus as recited in claim 2 wherein the input means comprises:

a first zone of the second type semiconductivity spaced from one of said plurality of zones and disposed in such a manner that the electrode which overlaps said last-mentioned one zone also overlies the space between said first zone and said last-mentioned one zone;

a second zone of the second type semiconductivity spaced from the first zone;

a dielectric overlying the first zone, the second zone, and the space therebetween;

a conductive electrode overlying a portion of the last-mentioned dielectric and being delimited in lateral extent so as to extend over substantially all of the space between the first and second zones and over a substantial portion of the first zone; and voltage source means coupled to said last-mentioned electrode for applying thereto voltages sufficient to cause predetermined quantities of background charge of the type recited in claim 1 to be drawn from the second zone into the first zone.

5. In a method of operating semiconductor apparatus of the type adapted for storage and sequential transfer of mobile charge carriers representing signal information and localized in instantaneous storage sites along the surface of a semiconductive body between an input portion and an output portion and which comprises:

a storage medium;

a dielectric layer disposed over a surface of the storage medium;

a plurality of localized conductive electrodes disposed over the dielectric layer and forming a path between the input portion and the output portion;

and wherein the method of operation comprises:

applying a pair of clock voltages alternately to successive ones of the electrodes, the pair of voltages being sufficient to cause the advance of a packet of mobile charge carriers from each instantaneous storage site to the next instantaneous storage site along the path at each alternation of the voltages;

applying signals to the input of the apparatus sufficient to cause in synchronization with the clock voltages variations in the number of mobile charge carriers in the input portion, said variations representing signal information;

the improvement comprising:

circulating through the apparatus a fixed, predetermined quantity of mobile background charge carriers superimposed upon the aforementioned mobile charge carriers representing signal information, the quantity of the background charge carriers being sufficient that at each alternation of the clock voltages there is always transferred from each instantaneous storage site a net quantity of mobile charge carriers to the next instantaneous storage site along the path.

6. A method as recited in claim 5 wherein: the input signals are digital signals applied such that a packet of mobile charge carriers represents a one and the absence of a packet of mobile charge carriers represents a zero; and the ones and zeros are superimposed upon the background mobile charge carriers.

7. A method as recited in claim 6 wherein the quantity of the background charge is sufficient to reduce signal degradation due to incomplete charge transfer and due to surface state trapping and is insufficient in relation to the magnitude of the applied clock voltages when combined with the mobile charge carriers representing signal information to be greater than the maximum amount of charge which can be completely transferred for that magnitude of clock voltages.

8. A method as recited in claim 5 wherein the input signals and the background charge are applied by irradiating the apparatus sufficiently to cause photogeneration of the mobile charge carriers.

* * * * *

UNITED STATES PATENT OFFICE
CERTIFICATE OF CORRECTION

Patent No. 3,660,697 Dated May 2, 1972

Inventor(s) Carl N. Berglund and Harry J. Boll

It is certified that error appears in the above-identified patent and that said Letters Patent are hereby corrected as shown below:

Column 2, line 68, change "15a-15bj" to --15a-15n--;

line 69, change "16a-16bj" to --16a-16n--.

Column 3, line 7, change "(15a-15bn)" to --(15a-15n)--;

line 12, change "(16a-16bn)" to --(16a-16n)--;

line 15, change "(18a-18bn-1)" to --(18a-18n-1)--.

Column 6, line 6, change "line 16" to --line 16'--.

Column 7, line 4, change "out" to --our--.

Signed and sealed this 27th day of February 1973.

(SEAL)
Attest:

EDWARD M.FLETCHER,JR.
Attesting Officer

ROBERT GOTTSCHALK
Commissioner of Patents